United States Patent [19]

Sande et al.

[11] Patent Number: 4,624,745
[45] Date of Patent: Nov. 25, 1986

[54] FOAM CONTROLLER

[75] Inventors: Walter E. Sande; Barrie D. Stroud, both of Shelton; Dan P. Dumdie, Vancouver, all of Wash.

[73] Assignee: ITT Corporation, New York, N.Y.

[21] Appl. No.: 645,978

[22] Filed: Aug. 31, 1984

[51] Int. Cl.[4] .......................... B01D 19/04; D21C 3/28
[52] U.S. Cl. ..................................... 162/252; 55/178; 162/254
[58] Field of Search .............. 162/252, 198, 254, 380, 162/56, 60; 55/87, 178; 159/DIG. 4; 203/20; 202/264; 210/86

[56] References Cited

U.S. PATENT DOCUMENTS 3,425,952  2/1969  Gaughan et al. .............. 159/DIG. 4
3,427,252  2/1969  Gaughan et al. .............. 159/DIG. 4
4,003,724  1/1977  Payne et al. ..................... 55/87
4,146,425  3/1979  Gutzeit ............................ 162/259

FOREIGN PATENT DOCUMENTS 296593  4/1971  U.S.S.R. ....................... 159/DIG. 4

Primary Examiner—Steve Alvo
Attorney, Agent, or Firm—T. L. Peterson; R. C. Turner

[57] ABSTRACT

An apparatus for controlling the rate at which a defoaming agent is supplied to a processing vessel. A first sensing element senses the quantity of liquid in the vessel. A second sensing element senses the position of the upper surface of the foam. A signal processing circuit combines the outputs of the first and second sensing elements to produce a signal that is used to optimize the rate at which defoaming agent is supplied to the vessel. In this manner, the amount of defoaming agent that is used is reduced, thereby reducing the cost of operating the process.

13 Claims, 5 Drawing Figures

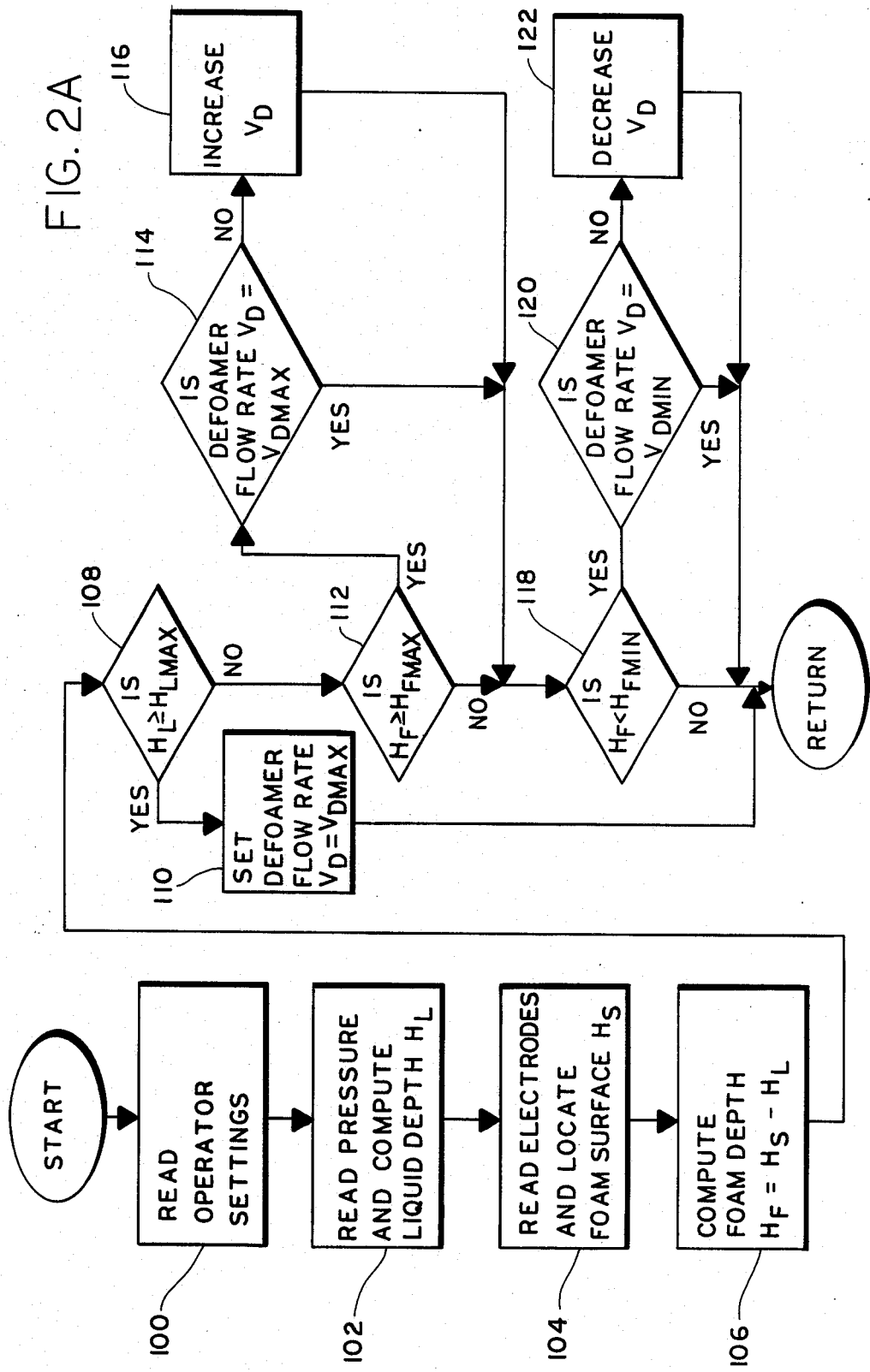

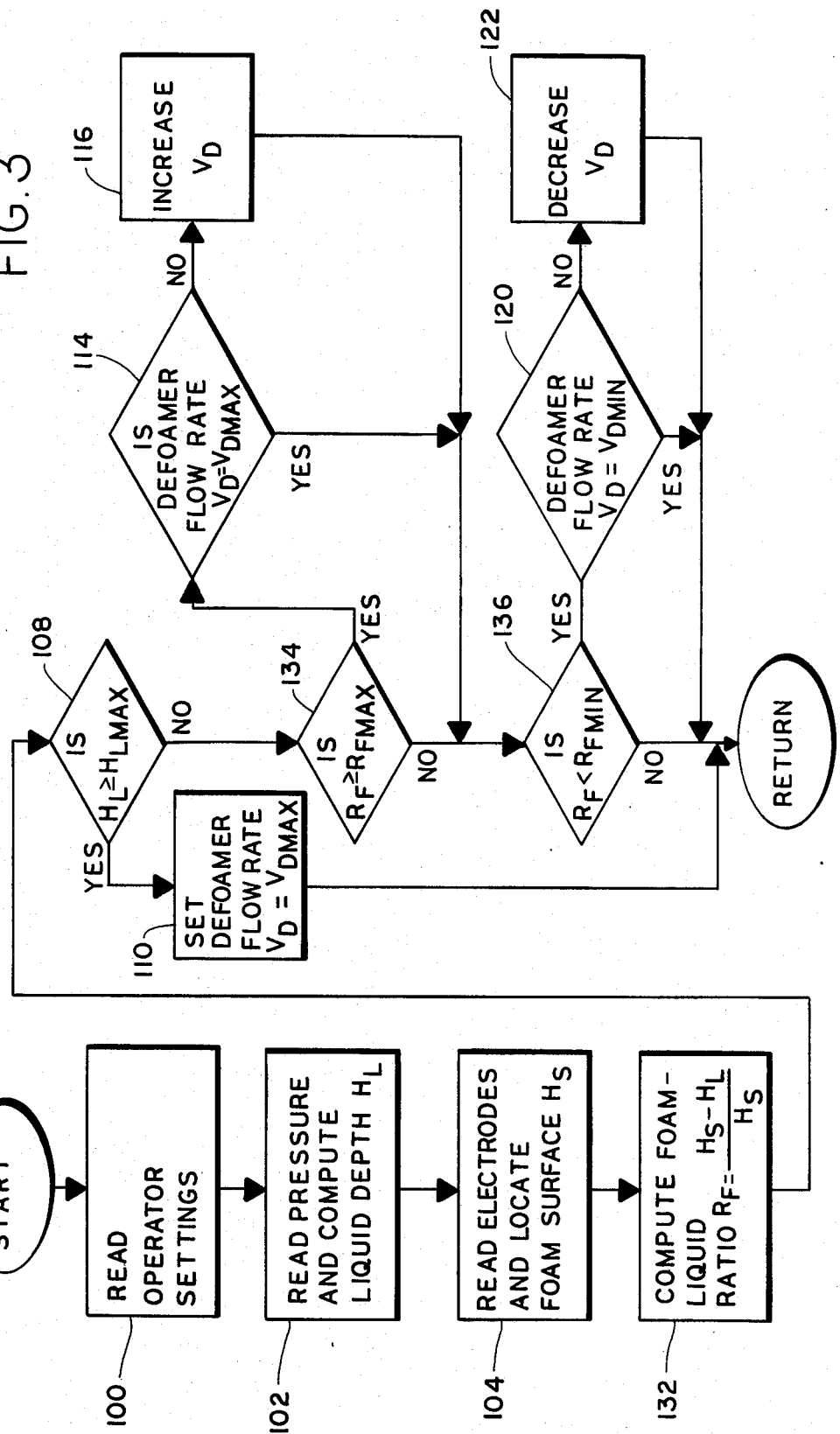

FOAM CONTROLLER

BACKGROUND OF THE INVENTION

The present invention relates to a foam control apparatus and is directed more particularly to a defoaming apparatus which optimizes the rate at which a defoaming agent is supplied to a processing vessel.

In many processes in which a solid is treated by exposure to a liquid, the formation of a foam can impair the efficiency or operability of the process. In the paper industry, for example, the formation of excessive quantities of foam in pulp washers and pulp thickeners can result in vessel overflows or in equipment clogging. In order to prevent this excessive foam formation, it is a common practice to introduce a defoaming agent into the processing vessel. Because the quantity of foam that forms varies from batch to batch in a batch process, or with the rate of stock flow in a continuous-flow process, it is often difficult to determine the quantity or rate at which defoaming agent should be added.

Some process operators have dealt with the above difficulty by using a quantity or rate of flow of defoaming agent which is large enough to accommodate any possible quantity of foam. This approach has proved expensive, however, because it necessitates the use of an excess of defoaming agent under most operating conditions.

Other process operators have dealt with the above difficulty by using a single foam level sensing probe and by introducing defoaming agent into the vessel only when the top of the form makes contact with the probe. In such systems, the addition of defoaming agent continues until the top of foam once again loses contact with the probe. This approach can also be costly, depending upon the depth of the liquid beneath the foam. If, for example, the vessel contains a large quantity of liquid, the probe will tend to cause a large quantity of defoaming agent to be added thereby producing an unnecessarily thin foam layer. If, on the other hand, the vessel contains only a small quantity of liquid, the probe will cause little or no defoaming agent to be added, thereby producing an excessively thick foam layer.

SUMMARY OF THE INVENTION

In accordance with the present invention, there is provided a foam control apparatus which is not subject to the above-described difficulties. More particularly, there is provided a foam control apparatus which continuously senses both the quantity of foam and the quantity of liquid that are present, and which adjusts the rate at which defoaming agent is added as necessary to maintain the absolute or relative quantity of foam within acceptable limits. In this manner, the apparatus of the invention provides the process with all of the defoaming agent that is necessary to maintain the desired quantity of foam, but no more than is necessary. As a result, the quantity of defoaming agent that is used is minimized, resulting in substantial cost savings.

Generally speaking, the apparatus of the invention includes first and second probes for generating signals indicative of the quantity of liquid and foam within the vessel and signal processing circuitry for combining these signals to generate a control signal for controlling the rate at which defoaming agent is added to the vessel. Significantly, the apparatus of the invention is able to control the quantity of foam that is present without regard to whether the vessel is used in a batch process or a continuous process. In addition, the apparatus of the invention is able to control the quantity of foam that is present substantially without regard to whether the process is one which has a surface foam (i.e., one in which the foam and liquid are unmixed), or one which has an entrained foam (i.e., one in which the foam and liquid form a substantially continuous mixture).

In the preferred embodiment, the quantity of liquid is continuously monitored by means of a liquid sensor which is responsive to the depth of liquid in the vessel, and the quantity of foam is continuously monitored by a foam sensor which is responsive to the position of the upper surface of the foam. The actual or effective depth of the liquid may, for example, be determined from the pressure at a selected reference position within the vessel, provided that the density of the liquids is known. This pressure-based measurement is particularly desirable because it accurately reflects the quantity of liquid that is in the vessel without regard to whether the vessel contains a surface foam or an entrained foam. The position of the surface of the foam may, on the other hand, be determined by a conductive level sensing probe having a multiplicity of electrodes that are located at spaced intervals along the vertical dimension of the vessel. By selecting the proper number and spacing for these measuring electrodes, the position of the surface of the foam may be determined with any desired degree of accuracy. The position of the surface of the foam may be determined by a variety of other types of probes including capacitance probes and ultrasonic level detectors.

In accordance with one important feature of the present invention, the output signals of the liquid and foam sensors may be combined in any of a variety of ways to produce a control signal for controlling the rate at which defoaming agent is added so as to assure the maintenance of the desired relationship between the quantity of liquid and foam that are present. The output signals of the liquid and foam sensors may, for example, be used to determine the actual or effective depth of the foam. The latter depth may then be used to determine whether the rate of flow of defoaming agent must be increased, decreased or held constant in order to establish or maintain the desired foam depth. The output signals of the liquid sensor and the foam sensor may, on the other hand, be used to determine the ratio of the quantities of foam and liquid. The latter ratio may then be used to determine whether the rate of flow of the defoaming agent must be increased, decreased or held constant in order to establish or maintain the desired ratio of foam to liquid. The maintenance of other desired relationships between the quantities liquid and foam within a vessel are also possible.

Significantly, the above-described results may be provided not only in processes which produce surface foams, but also in processes that produce entrained foams. This is because, even in an entrained foam, the pressure at the selected reference position and the position of the foam surface together correctly indicate the quantities of liquid and foam that are present. The latter quantities, in turn, allow the entrained foam to be characterized in terms of an equivalent depth of liquid and an equivalent depth of surface foam. As a result, the output signals from probes used with an entrained foam may be used in the same manner as the output signals from probes used with a surface foam. Thus, the apparatus of the invention may be used interchangeably in processes which produce surface foams and processes which produce entrained foams.

BRIEF DESCRIPTION OF THE DRAWINGS

Other objects and advantages of the present invention will be apparent from the following description and drawings in which:

FIGS. 2a and 2b are flowcharts which depict one possible mode of operation for the embodiment of FIG. 1;

FIG. 3 is a flowchart which depicts another possible mode of operation for embodiment of FIG. 1.

DESCRIPTION OF THE PREFERRED EMBODIMENTS

Figure 1:
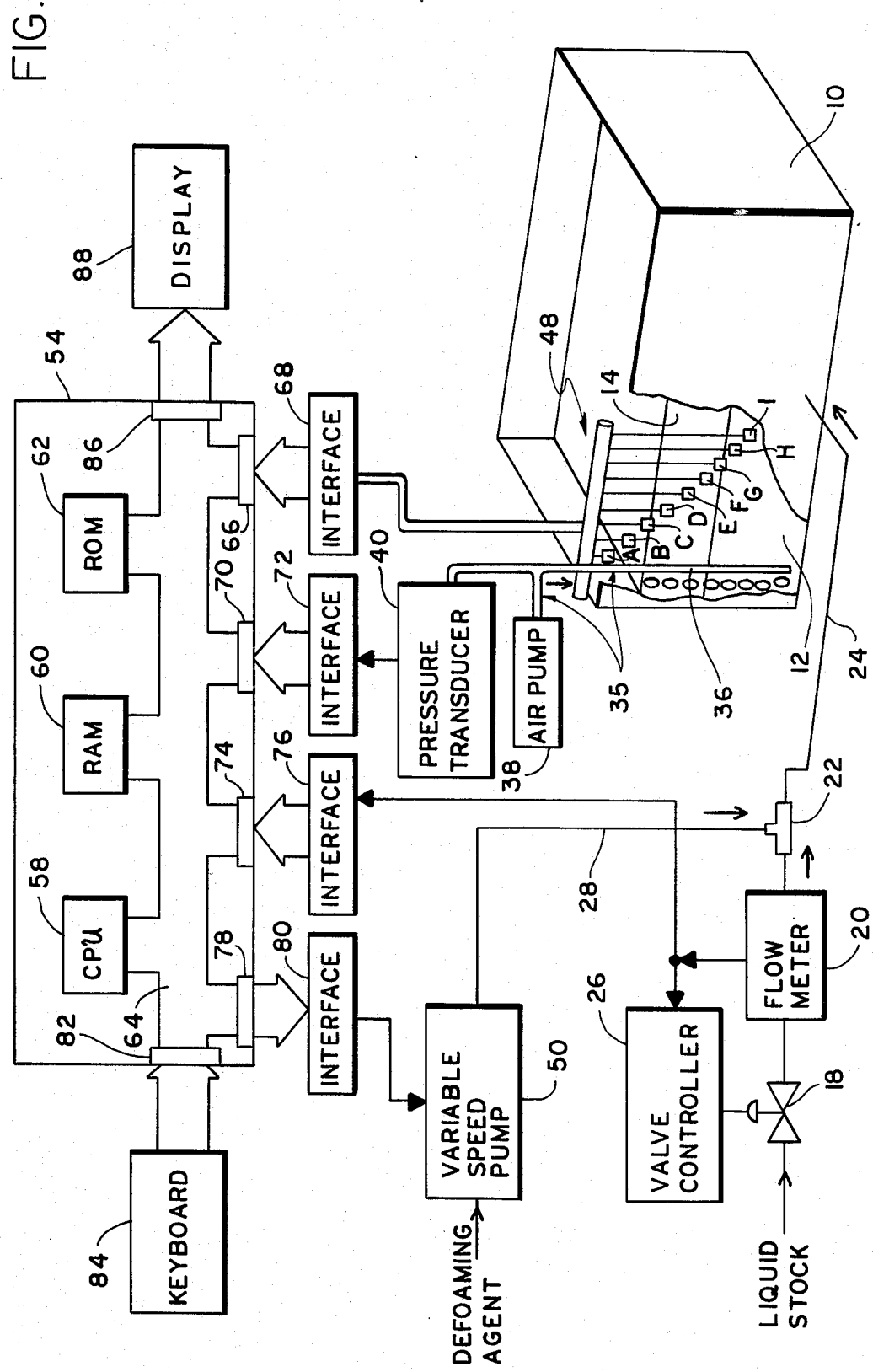
FIG. 1 is a block diagram of one embodiment of the present invention.

Referring to FIG. 1, there is shown a simplified mechanical and electrical block diagram of a material processing system which includes one embodiment of the foam control apparatus of the present invention. In the embodiment of FIG. 1, the processing system includes a vessel 10 which contains a mixture 12 of a processing liquid and the material being processed, commonly known as liquid stock, and a layer of foam 14 which floats on the surface thereof. Vessel 10 may, for example, comprise the vat of a pulp washer unit in which liquid stock 12 comprises a mixture of liquid and pulp and layer 14 is the foam that forms during the washing process. (The rotating washer drum is omitted from FIG. 1 for the sake of clarity.) It will be understood, however, that vessel 10 may in general comprise any open or closed vessel within which a liquid-foam mixture tends to form. The term "mixture" includes the case where the foam and liquid are separate, as well as the case where the foam is entrained in the liquid.

Liquid stock is supplied to vessel 10 from a source of liquid stock (not shown) through an adjustable flow control valve 18, a flowmeter 20, a mixing tee 22 and an inlet line 24. If the process that is carried out within vessel 10 is of the continuous-flow type, the output signal of flowmeter 20 may be fed back to a suitable valve control unit 26 in order to maintain a constant flow rate for the liquid stock. If, on the other hand, the process that is carried out within vessel 10 is of the batch type, the output signal of flowmeter 20 may be integrated before application to valve control unit 26 to assure that the supply of liquid stock is shut off when vessel 10 is filled to the desired level. Because flow control arrangements of these types are well known to those skilled in the art, they will not be further described herein.

In order that the quantity of foam within vessel 10 may be limited to an acceptable value, a suitable defoaming agent is supplied to mixing tee 22 from a source (not shown) through an inlet line 28. In mixing tee 22 the defoaming agent becomes mixed with the liquid stock prior to its introduction into vessel 10, thereby assuring that the desired defoaming action occurs at the earliest possible time, even if the liquid stock is not well stirred. If the liquid stock is well stirred, the defoaming agent may be introduced without the use of mixing tee as, for example, by spraying the defoaming agent on the surface of the liquid stock through a suitable nozzle.

Prior to the present invention, the rate of flow of the defoaming agent was in some cases controlled by the process operator who estimated the quantity of foam and manually adjusted a valve in defoaming agent inlet line 28. While this approach often allowed the quantity of foam to be limited to an acceptable value, it also tended to result in the use of excessive quantities of the defoaming agent and consequently in high operating costs. In other cases, the flow of the defoaming agent was controlled by a solenoid valve which was opened or closed depending upon whether or not the surface of the foam bridged or did not bridge a pair of foam sensing contacts. Even the latter approach, however, often caused too much or too little defoaming agent to be used because of the lack of a direct relationship between the position of the surface of the foam and the overall quantity of foam within the vessel.

In accordance with the present invention, the rate of flow of the defoaming agent is controlled by a closed loop feedback system which continuously adjusts the rate of flow of defoaming agent so as to maintain the desired relationship between the quantities of liquid and foam within the vessel. In the preferred embodiment, the apparatus of the invention includes a liquid sensing element or sensor 35 for generating an output signal that varies in accordance with the total quantity of liquid within the vessel and a foam sensing element or sensor 48 for generating an output signal that varies in accordance with the position of the upper surface of the foam. The apparatus of the invention also includes control means responsive to these output signals for controlling the rate of flow of the defoaming agent so as to maintain the desired relationship between the quantities of liquid and foam. As will be apparent from the following description, the sensing elements and the control means are so arranged that the desired liquid-foam relationship may be maintained without regard to whether the foam forms a discrete surface layer or is dispersed continuously throughout the liquid stock. As a result, the apparatus of the invention may be utilized both in processes which tend to form surface forms and in processes which tend to form entrained foams.

In the embodiment of FIG. 1, liquid sensor 35 includes a bubble tube 36 having an outlet which is located at a selected reference position within vessel 10, a source of compressed air such as an air pump 38 and a pressures trandsucer 40. In operation, pressure transducer 40 generates an output signal voltage or current which is indicative of the pressure necessary to force bubbles through bubble tube 36 and therefore of the liquid pressure at the reference position. In a process which has a surface foam, this reading will indicate the actual depth of the liquid at the reference position. In a process which has an entrained foam, however, the output reading of pressure transducer 40 will indicate the effective depth of the liquid, i.e., the depth of liquid which would be measured if the contents of the vessel were allowed to settle long enough for its liquid and foam fractions to separate. Thus, in both cases the pressure accurately indicates the total quantity of liquid within the vessel, without regard to whether some or all of the foam is intermixed with the liquid. It will be understood that other pressure measuring devices, such as Bourdon tubes or diaphragm type pressure sensors, may be used in place of bubble tube 36, if desired.

In the embodiment of FIG. 1, foam sensor 48 comprises a foam level probe assembly which includes 12 sensing electrodes 48A through 48L which are equally spaced along the height of vessel 10. As the level of foam within the vessel rises, it forms a conductive bridge between the grounded wall of the vessel and various ones of electrodes 48A through 48L. As a result, periodic determinations of the presence or absence of a predetermined level of current flow between the vessel wall and each of the electrodes allows the surface of the foam to be located between a particular pair of electrodes. Equivalently, periodic determinations of the presence or absence of a predetermined voltage between the vessel wall and each of the electrodes may be used. Naturally, the number and spacing of the electrodes will be dependent upon the depth of the vessel and the accuracy with which the position of the foam surface must be determined. It will therefore be understood that the invention is not restricted to any particular number of electrodes.

Advantageously, foam level probe assembly 48 can determine the position of the foam surface without regard to whether the foam is a surface foam or an entrained foam. As a result, probe 48 may be used both with processes which tend to form surface foams and with processes which tend to form entrained foams. The function of probe 48 may be served by other types of depth responsive sensors, such as capacitance probes or ultrasonic level detectors.

In accordance with one important feature of the present invention, the liquid depth information that is contained in the output of liquid sensor 35 and the foam position information that is contained in the output of foam sensor 48 are combined in such a way as to express the quantities of liquid and/or foam within vessel 10 in a form which is suitable for use in controlling the rate of flow of the defoaming agent. If, for example, it is desired to maintain an actual or effective foam layer of a particular depth, this may be accomplished by combining the outputs of the liquid and foam sensors to produce a control signal that varies in accordance with the difference between the actual or effective depth of the foam and the desired depth thereof. In such cases, the actual or effective thickness of the foam may be determined by subtracting the depth of the liquid from the position of the foam surface, i.e., the distance between the bottom of the probe and the upper surface of the foam.

If, on the other hand, it is desired to control the flow rate of the defoaming agent to maintain a particular ratio between the actual or effective quantities of liquid and foam, this may be accomplished by combining the outputs of the liquid and foam sensors to produce a control signal that varies in accordance with the difference between the actual or effective percentage by volume of foam and the desired percentage. In such a case, the actual or effective percentage by volume of foam may be determined by first determining the thickness of the foam in the previously described manner, and then dividing the same by the distance between the bottom of the probe and the top of the foam layer. (If the vessel has a width that is a function of depth, the effect of this function on volume must be taken into account before the division is carried out.)

In view of the foregoing, it will be seen that, by using both liquid and foam sensors, the apparatus of the invention allows the flow rate of the defoaming agent to be controlled so as to maintain any of a plurality of desired relationships between the quantities of liquid and/or foam within a processing vessel.

In the embodiment of FIG. 1, the control means includes a signal processing circuit 54 which may take the form of a digital microcomputer which has been programmed to combine the output signals of the liquid and foam sensors and to generate therefrom a control signal of the desired type. The control means of FIG. 1 also includes a flow control element such as a variable speed pump 50 or a controllable valve which is adapted to use the control signal to control the rate at which the defoaming agent is supplied to vessel 10.

Computer 54, which may be of any of a large number of commercially available types, includes a central processing unit or CPU 58, a read-write random access memory or RAM 60 and a read-only memory or ROM 62. The latter elements are coupled to one another by a bus 64 that is made up of a plurality of address, data and control lines which are not individually shown. Bus 64 also connects these elements to a plurality of I/O ports through which the computer may communicate with the external devices that are associated therewith. Included among these I/O ports are an input port 66 through which the computer may input the output signal of foam sensing probe 48, through a suitable interface 68, an input port 70 through which the computer may input the output signal of pressure transducer 40, through a suitable interface 72, and an input port 74 through which the computer can input the output signal of flowmeter 20, through a suitable interface 76. Also included among these I/O ports are an output port 78 through which the computer may output a control signal to variable speed pump 50, through a suitable interface 80, an input port 82 through which the computer may receive information from an operator via a keyboard 84 and an output port 86 through which the computer may provide information to an operator via a display 88. It will be understood that each of interfaces 68 through 80 includes the circuitry which provides any necessary signal level shifting, A/D conversion, buffering, amplification and the like. Because both computer 54 and its interfaces are conventional, their operation will not be described in detail herein.

Ordinarily, ROM 62 will contain all of the instructions necessary to control the circuitry in FIG. 1, except for certain quantities that vary from application to application, such as the maximum acceptable foam depth, the maximum acceptable liquid depth, the desired maximum and minimum defoaming agent flow rates (if any) and the system gain, i.e., the rate at which the speed of pump 50 will change as a result of a change in the quantity of foam within vessel 10. Variables of the latter type are preferably set by an operator at the time that the apparatus is being set up for operation with a particular process. These variables may, for example, be entered by an operator, via keyboard 84, based on observations of the set-up properties of the process. One or more of these variables may also be entered by an operator by adjusting various variable setting potentiometers which are then read by computer 54 through suitable interface circuits. Once these variables have been entered, they will not ordinarily be changed unless the process itself is changed.

Figure 2B:
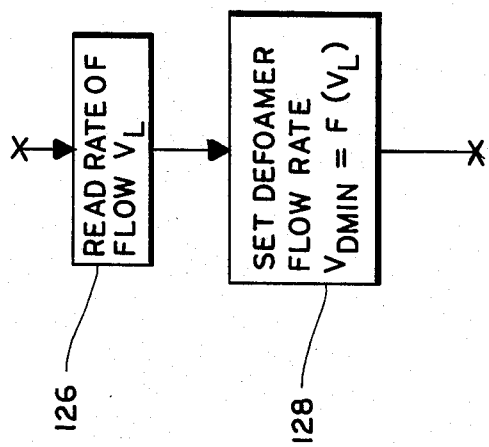

The manner in which signal processing computer 54 accomplishes the previously described results are most easily understood with reference to the flowcharts of FIGS. 2A, 2B and FIG. 3. Of these, the flowchart of FIG. 2A depicts the operation of an embodiment of the invention which controls the rate of flow of the defoaming agent so as to maintain the depth of the actual or effective foam layer within predetermined maximum and minimum limits, and which is applicable to both batch processes and continuous-flow processes. FIG. 2B depicts a variant of the flowchart of FIG. 2A which is applicable only to continuous-flow processes. FIG. 3 depicts the operation of an embodiment of the invention in which the ratio of foam to liquid within the vessel is maintained within predetermined maximum and minimum limits.

Referring first to the flowchart of FIG. 2A, the computer begins by reading the then current settings for variables such as the maximum and minimum defoamer flow rates and the maximum and minimum acceptable foam thicknesses (Block 100). The computer then proceeds to read the output signal of the liquid sensor and to determine therefrom the actual or effective depth of liquid $H_L$ (Block 102). Thereafter, the computer reads the output signal of the foam sensor and determines therefrom the position of the foam surface $H_S$ or, equivalently, the total depth of the liquid and foam (Block 104). The computer then proceeds to compute the actual or effective foam thickness by subtracting the former from the latter (Block 106).

Once the computer has determined the actual or effective foam thickness, it has all the information necessary to characterize the status of the process and to adjust the defoamer flow rate to accommodate the same. If, for example, the computer determines that the liquid depth is greater than or equal to the maximum acceptable liquid depth, it may automatically cause the defoamer flow rate to be set to its maximum value $V_{DMAX}$ to minimize the possibility of vessel overflow. This determination and the associated action are indicated in FIG. 2A by blocks 108 and 110. If the liquid depth is not at its maximum acceptable value, the computer then determines whether the actual of effective foam thickness is greater than or equal to the maximum acceptable foam thickness $H_{FMAX}$ and, if it is, increases the defoamer flow rate unless that rate is already at its maximum value. This determination and the associated actions are indicated in FIG. 2A by blocks 112, 114 and 116. Finally, the computer determines if the actual or effective foam thickness is less than the minimum acceptable foam thickness and, if it is, decreases the defoamer flow rate unless the rate is already at its minimum value. This determination and the associated actions are indicated in FIG. 2A by blocks 118, 120 and 122.

Once the above determinations have been made and the associated actions taken, the computer returns to block 100 to re-execute the program of FIG. 2A and thereby drive the defoamer flow rate still closer to a value which reflects the then current condition of the process. It will therefore be seen that by repeatedly executing the program of FIG. 2A, computer 54 continuously adjusts the flow rate of the defoaming agent as necessary to maintain the actual or effective foam thickness between the desired maximum and minimum acceptable values.

In processes of the continuous-flow type, it is sometimes desirable to have a minimum or baseline defoamer flow rate which bears a predetermined (e.g., proportional) relationship to the flow rate of the liquid stock. In such processes, the desired relationship between these flow rates may be established by including in the computer program instructions which cause the computer to periodically read the rate of flow $V_L$ of the liquid stock and to compute the baseline defoamer flow rate that is associated therewith. This additional feature is easily included by inserting between blocks 100 and 102 of the flowchart of FIG. 2A the blocks 126 and 128 shown in FIG. 2B, wherein the equation $V_{DMIN}=f(V_L)$ expresses the baseline defoamer flow rate as a function of the liquid stock flow rate.

Referring to FIG. 3, there is shown a flowchart of a program which may be used to maintain the ratio of foam to liquid within vessel 10 approximately at a desired value. This program is similar to that described in connection with FIG. 2A, like functioning blocks being similarly numbered, except that (i) the flowchart of FIG. 3 includes a block 132 which uses the output signals of the foam and liquid sensors to determine foam-liquid ratio $R_F$ in place of block 106; and (ii) includes blocks 134 and 136 which compare the current foam-liquid ratio with the maximum and minimum acceptable values thereof $R_{FMAX}$ and $R_{FMIN}$ in place of blocks 112 and 118. Because the operation of the program of FIG. 3 is so similar to that of the flowchart of FIG. 2A, the flowchart of FIG. 3 will not be further described herein.

Figure 4:
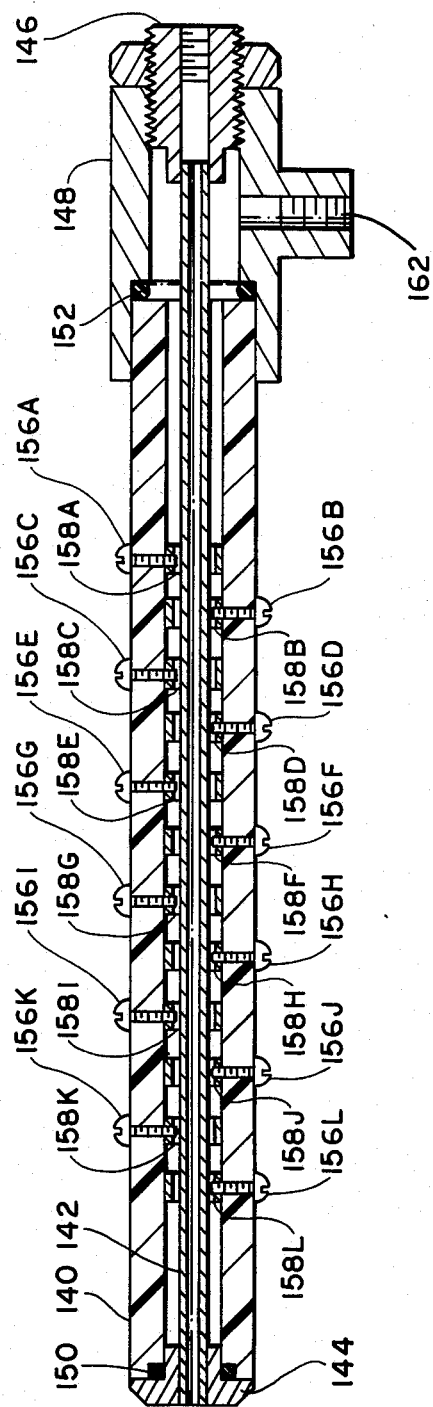
FIG. 4 is a cross sectional view of a combined liquid-foam sensing element which may be utilized in practicing the present invention.

Referring to FIG. 4, there is shown a combined probe assembly which provides both the liquid sensing function of sensor 35 and the foam sensing function of sensor 48. In the embodiment of FIG. 4, the combined probe assembly includes a generally tubular body member 140 which is preferably composed of a chemically inert non-stick plastic material such as polytetrafluoroethylene (TFE). The probe assembly of FIG. 4 also includes a stainless steel bubble tube 142 which is concentric with body member 140 and which is held in place by a lower end cap 144 and an upper end cap 146, the latter being threadedly secured within a mounting member 148. In order to prevent the liquid from leaking into the interior of the probe assembly, an O-ring 150 may be placed between body 140 and lower end cap 144 and an O-ring 152 may be placed between body 140 and mounting member 148.

To the end that the probe of FIG. 4 may provide the desired foam level information, body 140 is provided with a plurality of electrodes 156A through 156L which may take the form of screws that pass through the sides of body 140 and threadedly engage respective threaded internal conductor rings 158A through 158L. These screw-ring assemblies are connected to interface 68 through respective insulated conductors (not shown) which are routed through the hollow interior of body 140 and a side port 162 in mounting member 148. In order to further assure that stock does not leak into the probe, the interior of body 140 may be pressurized by connecting the same to a suitable source of external air pressure through port 162.

If the liquid stock contains masses of pulp or other particulate matter, various parts of the probe of FIG. 4 may become coated or clogged. In order to prevent this, additional elements may be added to the probe or its environment. The clogging of the lower end of bubble tube 142 may, for example, be prevented by attaching a suitable cover screen to the lower end of cap 144. In addition, the accumulation of a coating on the external surface of body 140 may be prevented by periodically or continuously spraying the same with a flow of clean, non-conductive rinse water from a rinse water source not shown. The effect of coated material on the measuring electrodes may also be reduced by locating alternate one of the measuring electrodes on opposite sides of body 140, as shown in FIG. 4.

Because of its air content, the ability of a foam to conduct current is substantially less than that of the liquid stock. As a result, if the vessel contains a surface foam, the difference in the level of conduction that occurs between the electrodes that are exposed to the liquid stock and those that are exposed to the foam layer may be used to determine both the depth of the liquid stock and the position of the surface of the foam. It is therefore possible in such cases to use a single multielectrode probe as both a liquid sensor and a foam sensor. While such embodiments are within the contemplation of the present invention, they are nevertheless not preferred embodiments thereof. This is not only because such a sensing arrangement provides a less accurate indication of the liquid depth, but also because such a sensing arrangement cannot be used in processes which contain or may contain an entrained foam.

While the foregoing description and drawings disclose a number of specific embodiments, it will be understood that the present invention is not limited thereto and that the true scope of the present invention should be determined only with reference to the appended claims.

What is claimed is:

1. An apparatus for controlling the quantity of foam within a vessel which is supplied with a liquid through a first conduit and with a defoaming agent through a second conduit, and which holds a mixture formed of liquid and foam, said apparatus comprising:
   liquid sensing means for generating a first signal that is a function of the quantity of the liquid in the vessel,
   foam sensing means for generating a second signal that is a function of the quantity of foam in the vessel,
   control means responsive to the first and second signals for controlling the rate of flow of the defoaming agent through the second conduit to limit the quantity of foam within the vessel to an acceptable value,
   said liquid sensing means including means for sensing the pressure of liquid in said vessel at a location near the bottom of the vessel, and means for determining the effective height of the liquid from said sensed pressure,
   said foam sensing means detects the height of the upper surface of the mixture,
   computer means for determining the quantity of foam in the vessel from the effective height of the liquid and the height of the upper surface of the mixture, and
   control means for controlling the rate of flow of the defoaming agent through the second conduit in response to the determined quantity of foam in the vessel to limit the quantity of foam in the vessel to an acceptable value.

2. The apparatus of claim 1 in which the liquid sensing means is responsive to the pressure at a selected reference position within the vessel.

3. The apparatus of claim 2 in which the liquid sensing means includes a bubble tube having an outlet for placement at the reference position.

4. The apparatus of claim 2 in which the foam sensing means comprises a probe having a plurality of vertically spaced electrodes.

5. The apparatus of claim 4 in which said electrodes are supproted on an elongated electrically nonconducting body.

6. The apparatus of claim 5 in which said body also supports the liquid sensing means.

7. The apparatus of claim 6 in which the liquid sensing means includes a bubble tube which is located within said body.

8. The apparatus of claim 2 in which the foam sensing means comprises an ultrasonic level detector.

9. The apparatus of claim 1 in which there is a physical interface between the foam and the liquid in the vessel, and in which the control means uses the first and second signals to fix the location of said interface and then uses said location to determine the quantity of foam.

10. The apparatus of claim 1 in which there is no physical interface between the liquid and foam in the vessel, and in which the control means uses the first and second signals to fix the location of a virtual interface between the liquid and foam and then uses said location to determine the quantity of foam.

11. The apparatus of claim 1 in which the control means includes a flow control element connected in series with the second conduit, and a signal processing circuit for controlling the rate of flow through the flow control element in accordance with said first and second signals.

12. The apparatus of claim 1 in which the control means maintains a foam layer of approximately constant thickness in the vessel.

13. The apparatus of claim 1 in which the control means maintains an approximately constant percentage of foam in the vessel.

* * * * *